(12) United States Patent
Wei et al.

(10) Patent No.: US 8,698,829 B2
(45) Date of Patent: Apr. 15, 2014

(54) DISCRETE ELEMENT TEXTURE SYNTHESIS

(75) Inventors: Li-Yi Wei, Redwood City, CA (US);
Chongyang Ma, Beijing (CN); Xin Tong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 232 days.

(21) Appl. No.: 12/789,876

(22) Filed: May 28, 2010

(65) Prior Publication Data

US 2011/0292064 A1    Dec. 1, 2011

(51) Int. Cl.
*G09G 5/00* (2006.01)
(52) U.S. Cl.
USPC .......................................................... 345/582
(58) Field of Classification Search
None
See application file for complete search history.

(56) References Cited

U.S. PATENT DOCUMENTS

| | | | |
|---|---|---|---|
| 6,987,511 B2* | 1/2006 | Taubin | 345/420 |
| 7,023,447 B2 | 4/2006 | Luo et al. | |
| 7,136,072 B2 | 11/2006 | Ritter | |
| 2009/0058871 A1 | 3/2009 | Mech et al. | |
| 2009/0116732 A1 | 5/2009 | Zhou et al. | |
| 2011/0181589 A1* | 7/2011 | Quan et al. | 345/420 |

OTHER PUBLICATIONS

V. Kwatra et al., Texture Optimization for Example-based Synthesis, ACM SIGGRAPH 2005 Papers, pp. 795-802, Jul. 2005.*
D. D Kurlander, Graphical search and replace, SIGGRAPH '88 Proceedings of the 15th annual conference on Computer graphics and interactive techniques, pp. 113-120, Aug. 1988.*
Han et al., "Fast Example-Based Surface Texture Synthesis via Discrete Optimization", retrieved on Apr. 9, 2010 at <<http://research.microsoft.com/pubs/70526/tr-2006-199.pdf>>, Springer-Verlag New York, The Visual Computer: International Journal of Computer Graphics, vol. 22, No. 9, Oct. 2006, pp. 918-925.
Landes, Soler, "Content-Aware Texture Synthesis", retrieved on Apr. 9, 2010 at <<http://hal.inria.fr/docs/00/39/42/62/PDF/RR-6959.pdf>>, Institut National de Recherche en Informatique et en Automatique (INRIA), Article 6959, Jun. 11, 2009, pp. 1-23.
Ma et al., "Motion Field Texture Synthesis", retrieved on Apr. 9, 2010 at <<http://research.microsoft.com/pubs/101761/paper.pdf>>, ACM, Proceedings of Conference on Computer Graphics and Interactive Techniques (SIGGRAPH), Article No. 110, Aug. 13, 2009, pp. 1-9.
Wei, "Tile-Based Texture Mapping on Graphics Hardware", retrieved on Apr. 9, 2010 at <<http://graphics.stanford.edu/papers/tile_mapping_gh2004/final/paper_final.pdf>>, ACM and The Eurographics Association, Proceedings of Conference on Graphics Hardware, Aug. 12, 2004, pp. 55-63.

* cited by examiner

*Primary Examiner* — Kee M Tung
*Assistant Examiner* — Haixia Du
(74) *Attorney, Agent, or Firm* — Holly Nguyen; Carole Boelitz; Micky Minhas

(57) ABSTRACT

Output textures may be generated by synthesizing an input texture comprising discrete elements with a set of boundary conditions. Elements of the input texture are copied from the input texture to an output texture that is defined by a set of boundary conditions and are then refined. The elements of the output texture are refined by assigning domain and/or attribute information to the elements of the output texture element by minimizing an energy function measuring a similarity between output neighborhoods of the output texture and a corresponding best matching input neighborhood of the input texture.

20 Claims, 8 Drawing Sheets

400

OUTPUT TEXTURE
WITH BOUNDARY
HANDLING

OUTPUT TEXTURE
WITHOUT BOUNDARY
HANDLING

DISCRETE ELEMENT TEXTURE SYNTHESIS

BACKGROUND

When computers first started displaying graphics, the graphics were rudimentary. The graphics tended to depict objects using lines that define the edges and boundaries of the object while leaving the object relatively barren of any detail.

Over time, the capability of computers to display graphics having more detail (e.g., realism) has increased significantly. One relatively-modern approach in computer graphics is texturing or texture synthesis. In texturing, a source texture and a set of boundary conditions are used to generate a new graphic that adheres to the boundary conditions yet has an appearance similar to the source texture. For example, a plaid colored chair may be generated based on an input graphic of an arbitrarily colored chair and a plaid swatch without having to reconstruct the chair using a plaid coloring.

Previous texture synthesis techniques may be used to generate graphics that have various surface properties defined by an input texture, including color, reflection, transparency, or displacements. However, graphics generated using the previous texture synthesis techniques lack a desirable level of realism due to a lack of information about individual texture elements.

SUMMARY

Discrete element texture synthesis involves synthesizing an input texture that includes an arrangement of objects (e.g., an image of an arrangement of unique mixed vegetables) with an input shape image (e.g., a bowl) to generate an output texture (e.g., a bowl of mixed vegetables). First, the output texture is initialized by copying patches of the input texture to the output texture. Each element of the output texture is refined based on analyzing domain and/or attribute data of the input texture to generate a realistic-looking output texture.

The output texture may be refined by minimizing an energy function that measures a similarity between output neighborhoods of the output texture and a corresponding best matching input neighborhood of the input texture to generate a similarity set.

In various implementations, the energy function may be minimized based on a relative position of input elements of the corresponding best matching input neighborhood with respect to a center of the corresponding best matching input neighborhood. The energy function may further be minimized based on a relative position of a portion of the output discrete elements with respect to a center output discrete element.

In further implementations, discrete element texture synthesis involves editing attributes of the input discrete elements to generate the output texture.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Discrete element texture synthesis may generate realistic-looking images or models using output textures by copying elements of an input texture to an output texture that is defined by a set of boundary conditions and then refining the output texture element by element. For example, an input texture may have an arrangement of unique objects (i.e., "discrete elements") such as an arrangement of unique logs. The input texture may then be combined with a set of boundary conditions that defines a shape of a cabin to generate a realistic-looking log cabin.

Discrete element texture synthesis is derived, in part, on Markov Random Field (MRF) algorithms. The Markov Random Field algorithms model a texture as a realization of a local and stationary random process. For instance, each element of a texture image is characterized by a small set of spatially neighboring elements, and this characterization is the same for all elements. The intuition behind this model can be demonstrated as follows. Imagine that a viewer is given an image, but only allowed to observe it through a small movable window. As the window is moved the viewer can observe different parts of the image. The image is stationary if, under a proper window size, the observable portion always appears similar. The image is local if each element is predictable from a small set of neighboring elements and is independent of the rest of the image.

Unlike many prior texture synthesis methods which are derived from MRF algorithms, the discrete element texture synthesis techniques described herein compute both domain information (e.g., positions of pixels, vertices, or voxels) as well as attribute information (e.g., colors of pixels, vertices, or voxels) as part of the synthesis process. In other words, the discrete element texture synthesis techniques described herein not only preserve the individual elements of the input texture but also their aggregate distributions by ensuring that the input texture and the output texture have similar texture neighborhoods.

As used herein, discrete elements (or simply "elements") are unique elements of the input texture. For example, if the input texture is a bowl of vegetables, then the discrete elements are any single pea, carrot, bean, or piece of corn, etc. This is distinguishable from other texture synthesis techniques which focus either on individual pixels or patches of pixels rather than discrete elements.

The process and systems described herein may be implemented in a number of ways. Example implementations are provided below with reference to the following figures.

Introduction

Figure 1:
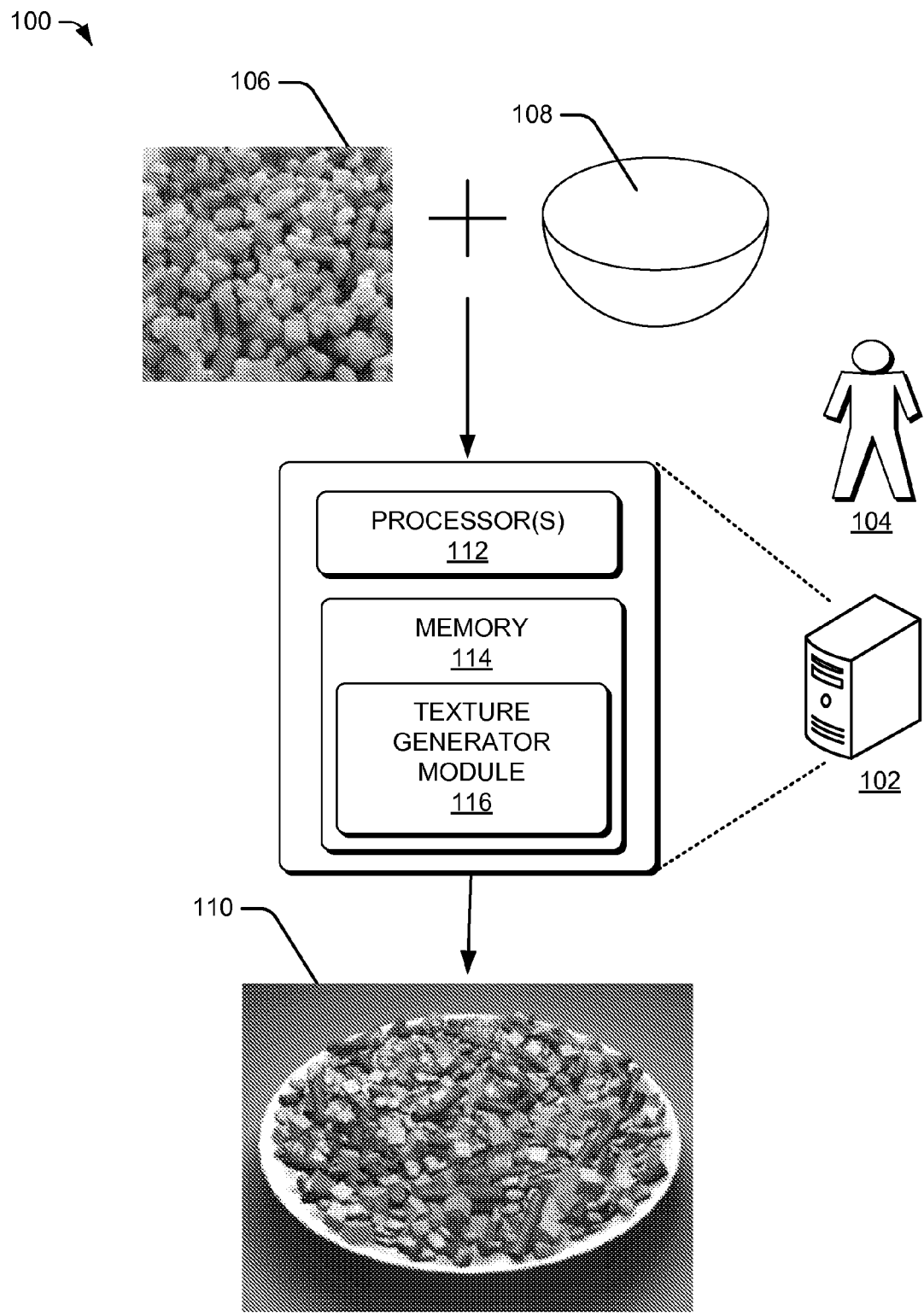
FIG. 1 is a schematic diagram of an illustrative environment used to generate output textures using with discrete element textures.

FIG. 1 is a schematic diagram of an illustrative environment 100 used to generate realistic-looking output textures using discrete element texture synthesis techniques. The environment 100 includes a computing device 102 that is configured to generate output textures using discrete element texture synthesis techniques. The computing device 102 may be a server, a desktop computer, a tablet, a mobile computer, a mobile telephone, or a gaming console, among other possible computing devices. The computing device 102 may enable a user 104 to specify an input texture 106 and boundary conditions 108 as a basis for generating an output texture 110 that is a combination of the input texture and the boundary conditions.

As described or referenced herein, the input texture 106 is an arrangement of discrete elements. For example, the input texture 106 may be an arrangement of unique mixed vegetables (i.e., corn, peas, green beans, and carrots) such as illustrated in FIG. 1. Other examples of input textures include an arrangement of fruits, logs, stones, etc. The various elements of the input texture 106 may be represented in a variety of graphics formats, such as a collection of two-dimensional (2D) bitmap pixels, a 2D vector graphic, or a three-dimensional (3D) polygonal mesh. In addition, the various elements may vary from one element to another such as how an arrangement of mixed vegetates may contain different vegetables (i.e., "elements") that vary from one element to another in color, size, shape, etc.

The boundary conditions 108 may define a desired shape of the output texture 110. For example, if the user 104 desires to generate an output texture that is a bowl of mixed vegetables, the boundary conditions 108 may be a shape of a bowl as illustrated in FIG. 1. In general, the boundary conditions 108 may define any physically plausible shape such as a stack, box, floor, plate, hut, statue, volume, surface, shell, etc.

The computing device 102 may generate realistic-looking output textures in accordance with discrete element texture synthesis techniques by first copying elements of the input texture to the output texture and then refining the output texture element by element. For instance, the computing device may refine each element of the output texture by minimizing an energy function that examines domain and/or attribute information of the input texture.

Various techniques may be used to enable the user 104 to specify the input texture 106 and the boundary conditions 108. For instance, the input texture 106 and the boundary conditions 108 may be recorded, computed or prepared using conventional techniques such as via standard modeling tools and stored on some type of computer-readable medium such as the memory 114. Alternatively, the input texture 106 and the boundary conditions 108 may be captured from a signal input source such as a digital still or video camera.

In an example configuration, computing device 102 may include one or more processors 112 ("processors") and memory 114. Depending on the exact configuration and type of server, the memory 114 may be volatile (such as RAM), non-volatile (such as ROM, flash memory, etc.) or some combination of the two. The memory 114 may include a texture generator module 116 to perform the discrete element texture synthesis techniques described herein. For example, the texture generator module 116 may generate the output texture 110 based on the input texture 106 and the set of boundary conditions 108.

Once generated, the output texture 110 may be stored and made available for use by a graphics processing unit (GPU) or other specialized microprocessor of a computer system for use computer graphic applications. In some embodiments, the output texture 110 is stored to the computing device 102.

Illustrative Algorithm

In general, the objective of discrete element texture synthesis can be formulated as follows: given an input texture Z (i.e., 106) consisting of a set of elements with the relevant domain, p, and attribute information, q, the goal is to refine an initialized output texture X (i.e., 110) such that X is similar to Z in terms of both p and q.

As used herein, the domain metric, p, represents element position and is defined as a measured difference p(s)−p(s') between two elements s and $s_o$ via Euclidean metrics. The attribute metric, q, as used herein may represent a variety of texture attribute information depending on the particular application scenario. For the simplest case of point distribution, q may be empty. Alternatively, q may represent one or more of element orientation, geometry, appearance, and/or type. With respect to orientation, q may represent the orientation of an element as a normalized quaternion for both two-dimensional and three-dimensional cases. For instance, q may be the difference between two quaternions by taking an inverse cosine of their dot product. With respect to geometry, q may represent a size or shape of the elements. For instance, a size or shape difference between two elements may be measured via a Hausdorff distance. In some embodiments, the Hausdorff distance is measured after aligning element centers and orientations to avoid double counting their contributions. With respect to appearance, q may represent any variety of element attributes including colors and textures. In some embodiments, color histograms are used to measure the appearance.

With respect to type, q may represent an intrinsic element attribute. For instance, while geometry and appearance describe intrinsic element attributes, the type metric goes beyond geometry and appearance to describe other kinds of intrinsic element attributes such as high level semantic meanings. In some embodiments, the type metric is represented by a number integer. For instance, the type metric may be 0 when there are no intrinsic differences between elements and 1 when there are intrinsic differences between elements. In some embodiments, the user specifies the type metric as a distance metric between intrinsic element properties. Alternatively, the number integer may be computed in instances such as when the number of input elements is sufficiently small or can be grouped into a small number of types.

In some embodiments, the discrete element texture synthesis techniques may refine elements of an initialized output texture by minimizing the energy function defined in Equation 1.

$$E_t(X; Z) = \Sigma_{s \in X^\dagger} |X_s - Z_s|^2 \qquad \text{(Equation 1)}$$

In Equation 1, $E_t$ denotes the energy function; X denotes the initialized output texture; Z denotes the input texture; $X_s$ and $Z_s$ are local neighborhoods around an element S of the output texture 110 and the input texture respectively; and $X^\dagger$ denotes a subset of all input elements.

In general, Equation 1 calculates a similarity between the input texture Z and the initialized output texture X by analyzing local neighborhoods around elements of the input texture Z and the initialized output texture X. Specifically, for each output element S of the initialized output texture X, an output neighborhood $X_s$ is defined as a small set of elements that are near to the output element s. Various input neighborhoods $Z_s$ of the input texture Z are examined to determine which input neighborhoods $Z_s$ are most similar to the output neighborhood $X_s$. For each input neighborhood $Z_s$, a distance ("similarity") between $X_s$ and $Z_s$ is calculated as the difference $X_s$–$Z_s$. The distance ("similarity") between $X_s$ and $Z_s$ is calculated for each $S \in X^\dagger$, a subset of all input elements and then a sum of the squared differences is determined per Equation 1 with a goal of finding an output texture X with a low energy value.

As noted above, the discrete element texture synthesis techniques described herein examines not only the relevant domain/position, p, but also the attribute information, q. As such, the distance term of Equation 1 (i.e., $|X_s-Z_s|^2$) may be written as a function of both p and q as shown in Equation 2.

$$|X_s-Z_s|^2 = \Sigma_{s'_o \in X_s} |\hat{p}(s'_o) - \hat{p}(s'_i)|^2 + \alpha |q(s'_o) - q(s'_i)|^2 \quad \text{(Equation 2)}$$

In Equation 2, $s'_o$ denotes an element in the output neighborhood $X_s$, $s'_i$ denotes an element in the input neighborhood $Z_s$ that matches the element $s'_o$, $\hat{p}(s')$ denotes the relative position of $s'$ with respect to the neighborhood center s is defined by $\hat{p}(s')=p(s')-p(s)$, and $\alpha$ denotes the relative weight between the domain both p and the range q information.

Intuitively, Equation 2 finds, for each output element $s_o$ of the initialized output texture, the best match input element $s_i$ with the most similar neighborhood. In some embodiments, a k-coherence search for constant time computation is adopted to search for the best match input element $s_i$. In general, k-coherence builds a candidate set by taking a union of all similarity-sets (i.e., input neighborhoods $Z_s$ that are similar to the output neighborhood $X_s$) and then finds the best match among this candidate set.

Once the best match input element $s_i$ if found, the elements of the output texture may be refined in terms of domain and/or attribute information associated with the best match input element $s_i$.

Illustrative Process

Figure 2:
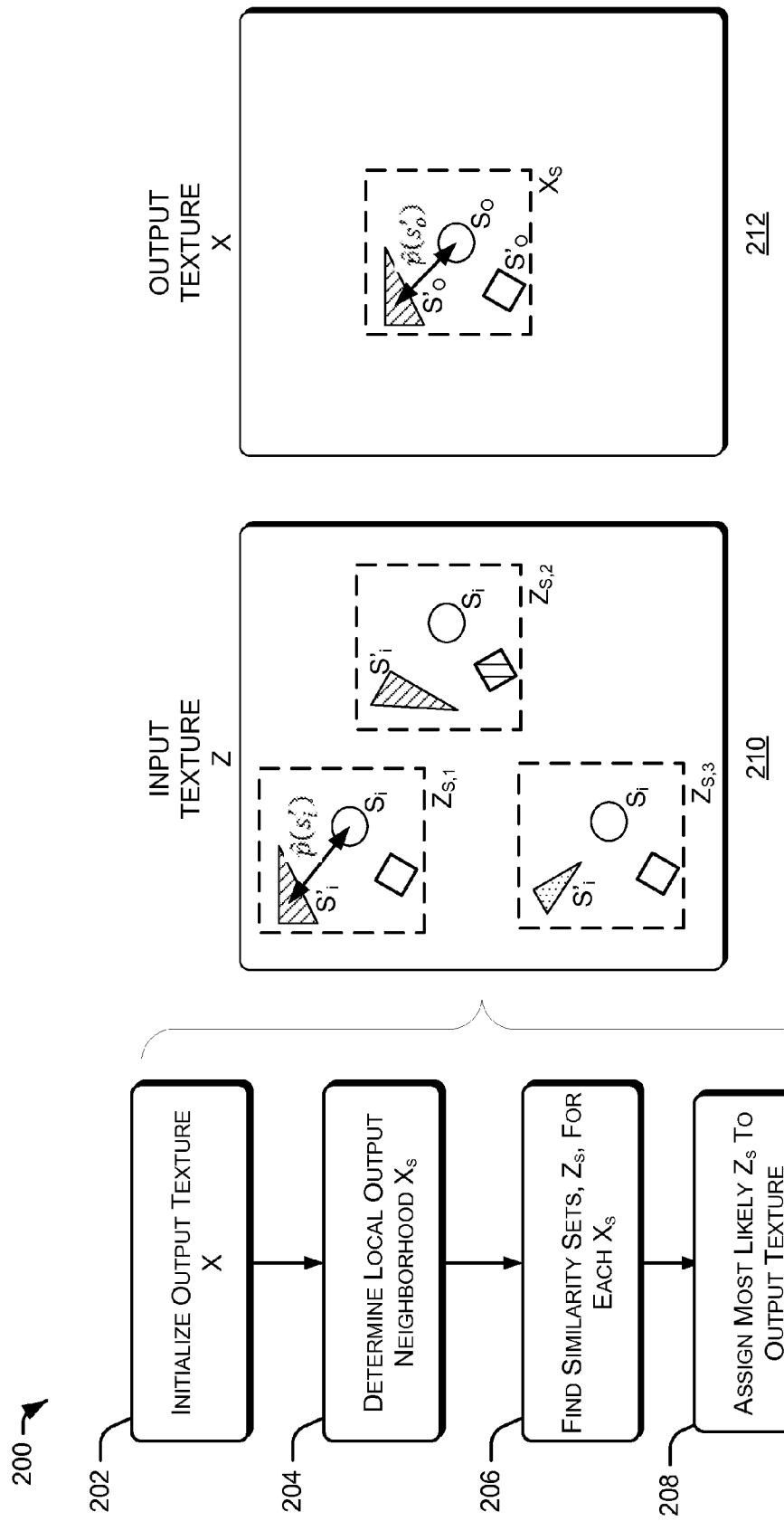
FIG. 2 is a pictorial flow diagram of an illustrative process of generating output textures in accordance with discrete element texture synthesis techniques.

FIG. 2 is a pictorial flow diagram of an illustrative process 200 of generating output textures in accordance with discrete element texture synthesis techniques described herein. The process 200 may be performed by the texture generator module 116.

The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, cause the one or more processors to perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly.

In general, the process 200 minimizes the energy value in Equation 2 by finding, for each output element $s_o$ the best match input element $s_i$ with the most similar neighborhood.

At 202, the texture generator initializes the output texture, X. In some embodiments, the texture generator initializes the output texture, X at 202 by coping patches of elements from the input texture to the output texture. Blocks 204-208 may then refine one or more output elements, $s_o$, of the initialized output texture using Equations 1 and 2. Pictorial input texture environment 210 and pictorial output texture environment 212 are provided to illustrate the various elements of the input texture Z and the output texture X as discussed throughout FIG. 2.

At 204, the texture generator determines a local output neighborhood, $X_s$, surrounding each output element, $s_o$ of the initialized output texture X. In some embodiments, a size of the local output neighborhood, $X_s$, is variable. For example, a user may specify the spatial extent of the neighborhoods such that for each element s the texture generator constructs its neighborhood $X_s$ by taking the union of all elements within the spatial extent centered at s.

At 206, the texture generator finds most similar input neighborhoods $Z_s$ (i.e., similarity sets) for each output neighborhood $X_s$ of the initialized output texture, X. In some embodiments, the texture generator finds the most similar input neighborhoods $Z_s$ based on the relative position of s' with respect to the neighborhood center s. In other words, the texture generator finds the most similar input neighborhoods $Z_s$ for each output neighborhood $X_s$ by first identifying element pairs $(s'_i, s'_o)$ which have with minimum $|\hat{p}(s'_o) - \hat{p}(s'_i)|$ (i.e., the position term of Equation 2), excluding the identified elements pairs for further consideration, and repeating this process to find each element pair in the output neighborhood $X_s$. In some instances, the input neighborhood $Z_s$ may be prevented from running out of elements before the output neighborhood $X_s$ by not presetting the spatial extent of $Z_s$ (i.e., essentially setting the size of $X_s$ to infinity).

At 208, the texture generator assigns domain and/or attribute information to one or more output elements of the initialized output texture X based on domain and/or attribute information associated with the most likely input neighborhood $Z_s$. In other words, the texture generator refines each element of the initialized output texture at 208 based on domain and/or attribute information associated with the most likely input neighborhood $Z_s$. In some embodiments, the texture generator assigns the domain and/or attribute information to the output elements based on element pairs $(s'_i, s'_o)$ that have a minimum $|\hat{p}(s'_o) - \hat{p}(s'_i)|$.

Illustrative Boundary Conditions

In general, process 200 finds the most similar input neighborhoods $Z_s$ at 206 based on the relative position of s' with respect to the neighborhood center s. In some instances, it may be desirable to find the similar input neighborhoods $Z_s$ based on the desired boundary conditions in addition to the relative positions. For instance, when synthesizing an arrangement of unique of vegetables with a bowl, it may be desirable to not only preserve the individual element positioning and attributes but also position the vegetables so that they are inside of the bowl rather than flowing out of the bowl.

Figure 3:
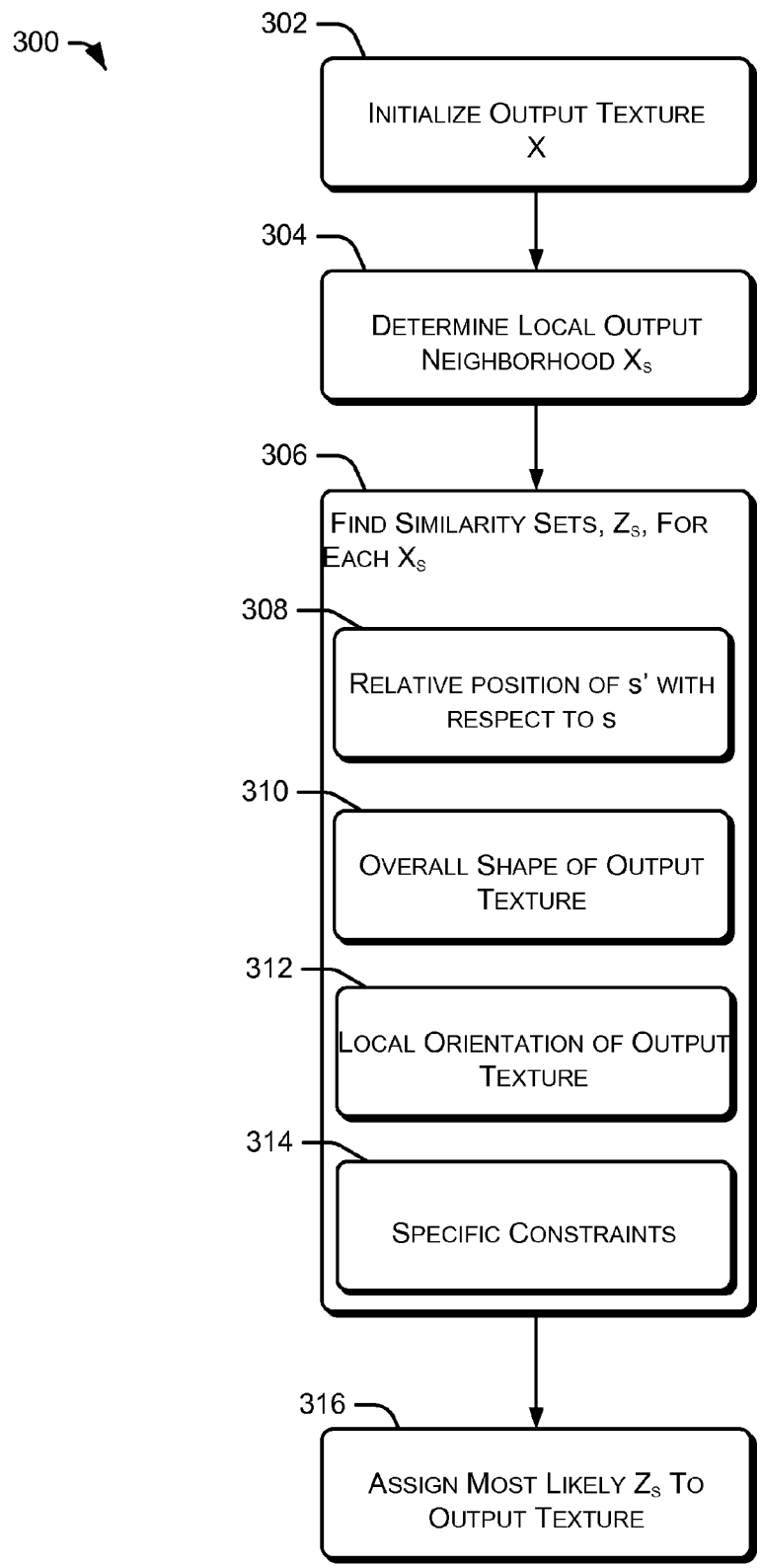
FIG. 3 is a flow diagram of an illustrative process of generating output textures in accordance with discrete element texture synthesis techniques including boundary conditions.

FIG. 3 is a flow diagram of an illustrative process 300 of generating output textures in accordance with discrete element texture synthesis techniques including boundary conditions 108. The process 300 may be performed by the texture generator module 116.

At 302, the texture generator initializes the output texture. In some embodiments, the texture generator pre-processes the input texture at 302 to identify the input texture as one or more discrete elements. For example, if the input texture is an arrangement of mixed vegetables, the texture generator may analyze the input texture at 302 to recognize the arrangement of mixed vegetables as various instances of peas, carrots, beans, etc. In some embodiments, the texture generator initializes the output texture, X at 302 by coping patches of elements from the input texture to the output texture. Blocks 304-316 are then performed for each element of the initialized output texture to refine the output texture in accordance with domain, p, and/or the attribute information, q, pertaining to similar elements of the input texture.

At 304, the texture generator determines a local output neighborhood, $X_s$, surrounding each output element, $s_o$ of the initialized output texture, X. In some embodiments, a size of the local output neighborhood, $X_s$, is variable. For example, a user may specify the spatial extent of the neighborhoods such that for each element s the texture generator constructs its neighborhood $X_s$ by taking the union of all elements within the spatial extent centered at s.

At 306, the texture generator may search for the most similar input neighborhoods $Z_s$ (i.e., similarity sets) for each output neighborhood $X_s$ surrounding each output element, $s_o$ of the initialized output texture, X. The texture generator may search for the most similar input neighborhoods $Z_s$ at 306 based one or more of the relative position of s' with respect to the neighborhood center s 308, an overall shape of the output texture 110, a local orientation of the output texture 312, and/or specific constraints 314.

At 308, the texture generator may search for the most similar input neighborhoods $Z_s$ by minimizing the position term $|\hat{p}(s'_o) - \hat{p}(s'_i)|$ of Equation 2.

At 310, the texture generator may search for the most similar input neighborhoods $Z_s$ by minimizing a density map term $|C_s - Z_s|$ defined in Equation 3.

$$|C_s - Z_s|^2 = \Sigma_{s'_i \in z_s} |C(s'_i) - 1|^2 \qquad \text{(Equation 3)}$$

In Equation 3, $C_s$ denotes a sampled density value of $X_s$ such that $C(s'_i)$ denotes a sampled density C at positions $\{p(s_o) + p(s'_i) - p(s_i), s'_i \in Z_s\}$. Equation 3 essentially shifts the entire input neighborhood $Z_s$ to the center location $p(s_o)$ and sample C at the shifted element positions. In some embodiments such as when the density map term $|C_s - Z_s|$ is used in conjunction with the position term $|\hat{p}(s'_o) - \hat{p}(s'_i)|$, a relative weight $\lambda$ is applied to the density map term to establish a desired distribution between the position term and the density map term. In such instances, the energy function of Equation 1 may be expressed as a combination of the position term and the density map term as illustrated in Equation 4.

$$E_t(X; Z) = \Sigma_{s \in X^t} |X_s - Z_s|^2 + \lambda |C_s - Z_s|^2 \qquad \text{(Equation 4)}$$

In Equation 4, $\lambda$ denotes the relative weight.

In some embodiments, the overall shape of the output texture 110 may be determined by the boundary conditions 108 and/or may be user defined input.

At 312, the texture generator may search for the most similar input neighborhoods $Z_s$ based on a local orientation of the output texture 110. For example, the texture generator may search input neighborhoods $Z_s$ having patterns that are aligned with a desired local orientation (e.g., desired flow patterns) rather than a default global coordinate frame to give the output texture 110 a pattern consistent with a desired flow pattern. In some embodiments, the user 104 specifies the local orientation of the output texture as an input to the texture generator. Once specified, the texture generator searches for input neighborhoods $Z_s$ using the local instead of the global frame at each element.

At 314, the texture generator may search for the most similar input neighborhoods $Z_s$ based specific constraints. For instance, if the output neighborhood is on a boundary, then the texture generator may search for input neighborhoods $Z_s$ that are boundary neighborhoods of the input texture 106. By using such specific constraints, the texture generator minimizes potential physical element penetrations and/or minimizes the potential of having an output texture that includes elements floating in mid-air.

Steps 310-314 in FIG. 3 are optional operations and thus the searching for the most similar input neighborhoods $Z_s$ at 306 may be performed with or without any single or combination of operations 310-314. In other words, the searching for the most similar input neighborhoods $Z_s$ at 306 may include any combination of steps 310-314.

At 316, the texture generator assigns domain and/or attribute information associated with the most likely input neighborhood $Z_s$ to elements of the initialized output texture. In some embodiments, the texture generator assigns the domain and/or attribute information associated the most likely input neighborhood $Z_s$ based on both the relevant domain, p, and attribute information, q of the input neighborhoods $Z_s$.

When assigning the domain and/or attribute information associated the most likely input neighborhood $Z_s$ to the initialized output texture at 316, it should be appreciated that the input texture 106 does not need to include all possible output boundary configurations. Rather, the combination of steps 310 and 312 may effectively generate the output texture 110 even though the output texture may contain different boundary shapes and orientations not present in the input texture 106.

Figure 4:
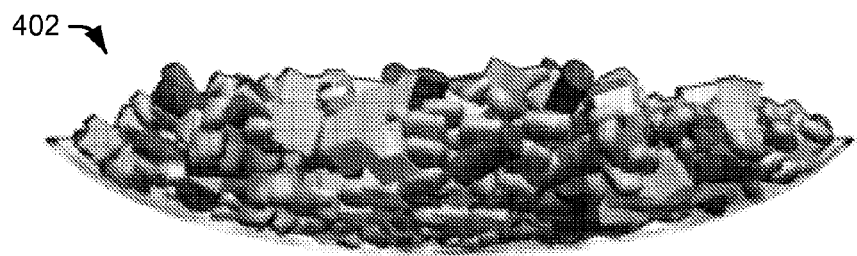
FIG. 4 depicts exemplary output textures generated in accordance with discrete element texture synthesis techniques with and without applying boundary conditions.
Figure 4:
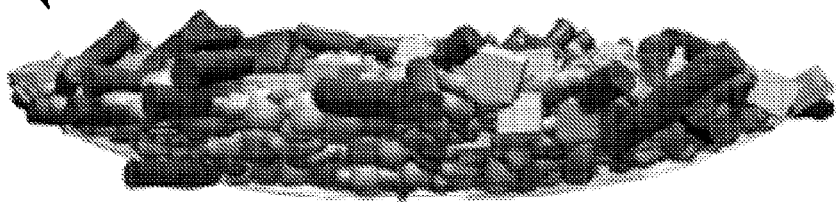

FIG. 4 illustrates exemplary output textures 400 that were generated using the same input texture 106. The output texture 110 was generated using both the position term and the density map term (i.e., step 306 of FIG. 3) and the output graph 404 was generates just using the position term (i.e., step 206 of FIG. 2).

As illustrated in FIG. 4, properly boundary handling is important to produce satisfactory output textures for certain discrete element textures that exhibit different distributions near and away from the overall boundaries such as a floor or sides of a box.

Illustrative Assignment

Figure 5:
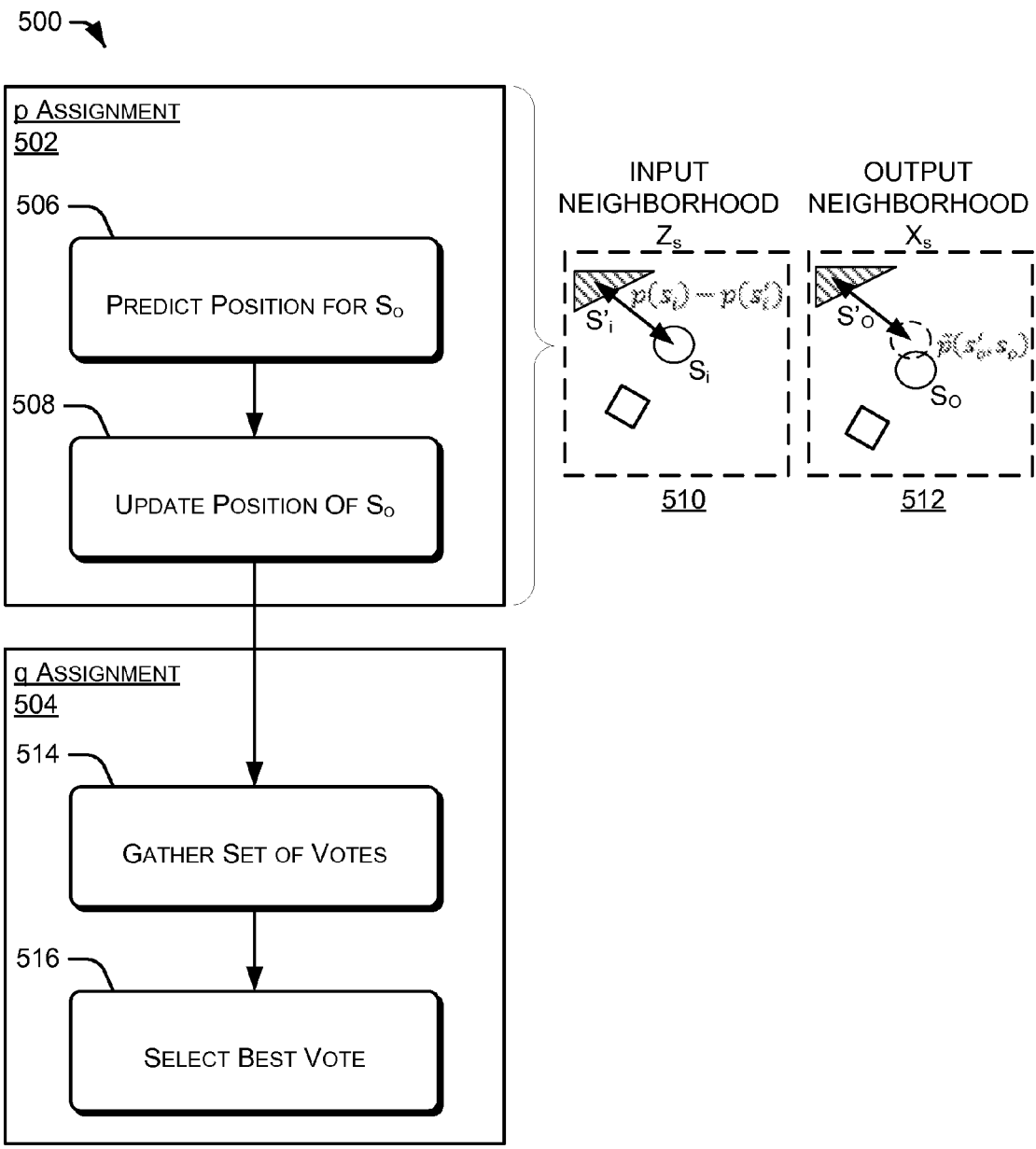
FIG. 5 is a pictorial flow diagram of an illustrative process to assign discrete elements to an output texture in accordance with discrete element texture synthesis techniques.

FIG. 5 is a pictorial flow diagram of an illustrative process 500 to assign domain and/or attribute information associated the most likely input neighborhood $Z_s$ to elements of the initialized output texture. Process 500 further illustrates step 208 of FIG. 2 and step 316 of FIG. 3. Accordingly, the assignment of the domain and/or attribute information may be broken into an assignment based on relevant domain, p, 502 and an assignment based on attribute information, q, 504.

Assigning domain information to elements of the initialized output texture based on domain information, p, associated the most likely input neighborhood $Z_s$ at 502 may include predicting a position for element $s_o$ at 506 and updating the position of $s_o$ based on a weighted combination of all predicted positions for element $s_o$ at 508. Pictorial input neighborhood environment 510 and pictorial output neighborhood environment 512 are provided to illustrate various elements of the input neighborhood $Z_s$ and the output neighborhood $X_s$ as discussed throughout FIG. 5.

At 506, assigning domain information to elements of the initialized output texture includes predicting a position for element $s_o$ of the initialized output texture. The predicted position $\tilde{p}(s'_o, s_o)$ for element $s_o$ may be determined using Equation 5.

$$\tilde{p}(s'_o, s_o) = p(s'_o) + p(s_i) - p(s'_i) \qquad \text{(Equation 5)}$$

In Equation 5, $s_i$ denotes the matching input element for $s_o$ and $s'_i$ denotes the matching input element for $s'_o$.

At 508, the position of $s_o$ of each element of the initialized output texture is assigned (i.e., refined) based on a weighted combination of all predicted positions for element $s_o$. The position of $s_o$ may be updated based on Equation 6.

$$p(s_o) = \frac{\sum_{s'_o} \omega(s'_o, s_o) \cdot \tilde{p}(s'_o, s_o)}{\sum_{s'_o} \omega(s'_o, s_o)} \qquad \text{(Equation 6)}$$

In Equation 6, ω denotes the relative weight and is defined in Equation 7.

$$\omega(s'_o, s_o) = \frac{1}{\alpha|s'_o - s_o| + 1}$$ (Equation 7)

In Equation 7, α denotes a user-specified constant. For example, the relative weight ω may be used in conjunction with the specific constraints discussed above to ensure that the position of $s_o$ is within certain boundary constraints.

Assigning attribute information to elements of the initialized output texture based on attribute information, q, associated with the most likely input neighborhood $Z_s$ at 504 may include assigning a set of votes for each output element $s_o$ at 514 and selecting the best vote at 516.

At 514, a set of votes $\{q(s_i)\}$ is gathered where each $s_i$ is matched to $s_o$ for a specific output neighborhood. The set of votes that are gathered at 514 depends on which attribute metrics, q, are important in light of the particular application scenario. For the simplest case of point distribution, q may be empty. Alternatively, q may represent one or more of element orientation, geometry, appearance, and/or type as described above.

At 516 the best vote a set of votes $\{q(s_i)\}$ is selected. In some embodiments, Equation 8 is used to select the vote that has the minimum sum of distance across the vote set $\{q(s_i)\}$.

$$q(s_o) = \mathrm{argmin}_{q(s_i)} \Sigma_{s'_i \in \{s_i\}} |q(s_i) - q(s'_i)|^2$$ (Equation 8)

In Equation 8, $q(s_i)$ denotes the attribute metric for element $s_i$ and $q(s'_i)$ denotes the attribute metric for element $s'_i$. In Equation 8, $s_i$ runs through the set of elements $\{s_i\}$ matched to $s_o$ to find a $q(s_o)$ that is closest to the arithmetic average of $\{q(s_i)\}$.

In some embodiments, Equation 8 takes into account desired local orientations of the output texture such as desired flow patterns. For example, the attribute metric of Equation 8 may be used to favor input elements that have desired flow patterns rather than resorting to a default global coordinate frame.

Equation 8 may further take into account specific constraints to select the best vote at 516. For example, if $s_o$ is a boundary element, then the texture generator may focus on attribute metric for element $s'_i$ (i.e., $q(s'_i)$) that indicates that $s'_i$ is a boundary element to select the best vote. By using such specific constraints during the assignment stage, the texture generator maintains a vertical elevation of floor elements to be invariant while minimizing the other energy terms of Equations 1 and 4.

As illustrated in FIGS. 2, 3, and 5, the texture generator provides various techniques for solving discrete element texture synthesis problems. For reference, pseudo-code illustrating various embodiments of discrete element texture synthesis solving techniques is provided below in table 1.

TABLE 1

Pseudo-Code for Discrete Element Texture Synthesis

Function X ← DiscreteElementTextureOptimization(Z)

```
//X: output distribution
//Z: input exemplar
X ← Initialize(Z)
iterate until convergence or enough number of iterations reached
    {Z_s, s ∈ X†} ← Search(X,Z)
    Assign({Z_s, s ∈ X†},X)
end
return X
```

TABLE 1-continued

Pseudo-Code for Discrete Element Texture Synthesis

Function {Z_s, s ∈ X†} ← Search(X,Z)

```
foreach element s ∈ X† //X†: a subset of all output elements
    X_s ← output neighborhood around s
    Z_s ← find most similar neighborhood in Z to X_s
end
return {Z_s}
```
Function ({Z_s},X)

```
foreach output element s ∈ X
    p(s) ← weighted combination of predicted positions
           from output neighborhood that overap s
    q(s) ← select the vote that minimizes the energy function
end
```

Figure 6:
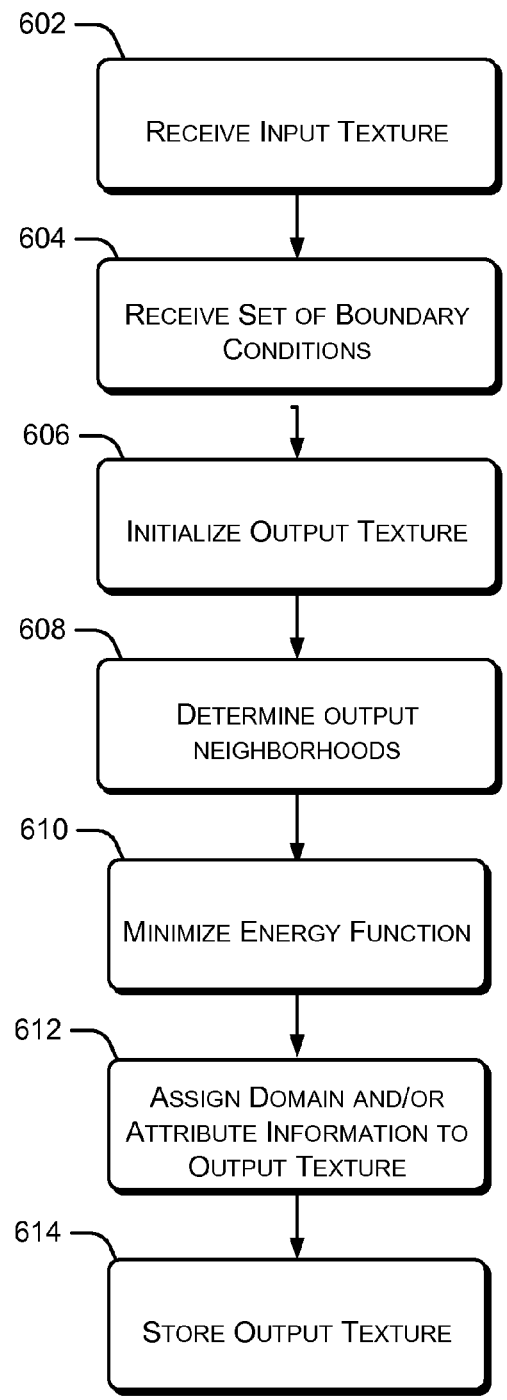
FIG. 6 is a flow diagram of an illustrative process of performing discrete element texture synthesis.

FIG. 6 is a flow diagram of an illustrative process 600 of performing discrete element texture synthesis. In general, the user 104 may desire to generate the output texture 110 that contains discrete elements of the input texture 106 and also adheres to a set of boundary conditions prescribed by the user. The texture generator module 116 may perform the discrete element texture synthesis process 600.

At 602, the texture generator module 116 receives an input texture comprising a set of discrete elements. The texture generator module 116 may receive the input texture 106 from a computer-readable medium which is either internal or external to the computing device 102.

At 604, the texture generator module 116 receives a set of boundary conditions defining a boundary of an output texture 110. In some embodiments, the boundary conditions 108 are received define any physically plausible shape such as a stack, box, floor, plate, hut, statue, volume, surface, shell, etc. Step 604 is an optional operation such that, in some embodiments, process 600 may be preformed without operation 604.

At 606, the texture generator module 116 initializes the output texture. In some embodiments, the texture generator module 116 initializes the output texture by copying one or more elements of the input texture to an output texture that is constrained by the received set of boundary conditions.

At 608, the texture generator module 116 determines one or more output neighborhoods representing output elements spatially surrounding a center output element of the initialized output texture. In some embodiments, the texture generator module 116 receives a desired size of the output neighborhoods from the user 104. For example, the user may specify the desired size of the output neighborhoods to containing roughly 1 to 3 ring neighbors (i.e., $3^n$ to $7^n$ neighborhood in n-dimensional synthesis) depending on whether the pattern is more stochastic or structured.

At 610, the texture generator module 116 minimizes an energy function. In some embodiments, the texture generator module 116 minimizes the energy function defined in Equation 1 to generate a similarity set of input neighborhoods. Alternatively, the texture generator module 116 minimizes the energy function defined in Equation 4 to generate a similarity set of input neighborhoods. The similarity sets of Equations 1 and 4 measure a similarity between each output neighborhoods $X_s$ surrounding each element of the initialized output texture and corresponding best matching input neighborhoods $Z_s$. Specifically, in Equations 1 and 4, the energy functions are minimizes at least based on a relative position of input elements of the corresponding best matching input neighborhoods $Z_s$ with respect to a center of the $Z_s$ corresponding best matching input neighborhood, and further based on a relative position of the output elements relative to the center output element.

In some embodiments, the texture generator module 116 may further minimize the energy function based on a density map term that examines a sampled density value of the one or more output neighborhoods; a desired local orientation of at least one of the output elements spatially surrounding the center output element of the output texture and/or a determination that an output neighborhood of the one or more output neighborhoods is on a boundary of the output texture.

At 612, the texture generator module 116 assigns properties to elements of the output texture. In some embodiments, the texture generator module 116 may assign the domain and/or attribute information to elements of the output texture by analyzing input discrete elements of the similarity set generated at operation 610. For instance, the texture generator module 116 may calculate a weighted combination of predicted positions of discrete elements within the output texture 110 to assign the elements to the output texture as described in Equations 6 and 7.

In instances where the user 104 desires to edit various discrete elements of the input texture 106. The texture generator module 116 examines attributes associated with discrete elements of the input texture and assigns discrete elements to the output texture 110. In some embodiments, the examined attributes may include an orientation of the one or more input discrete elements, a geometry associated with the one or more input discrete elements, an appearance of the one or more input discrete elements, and/or a type of the one or more input discrete elements.

At 614, the texture generator stores the output texture 110 in a computer readable storage medium. The texture generator may store the output texture 110 either to an internal computer readable storage medium such as memory 114 or an external computer readable storage medium.

Illustrative Distribution Editing

Figure 7:
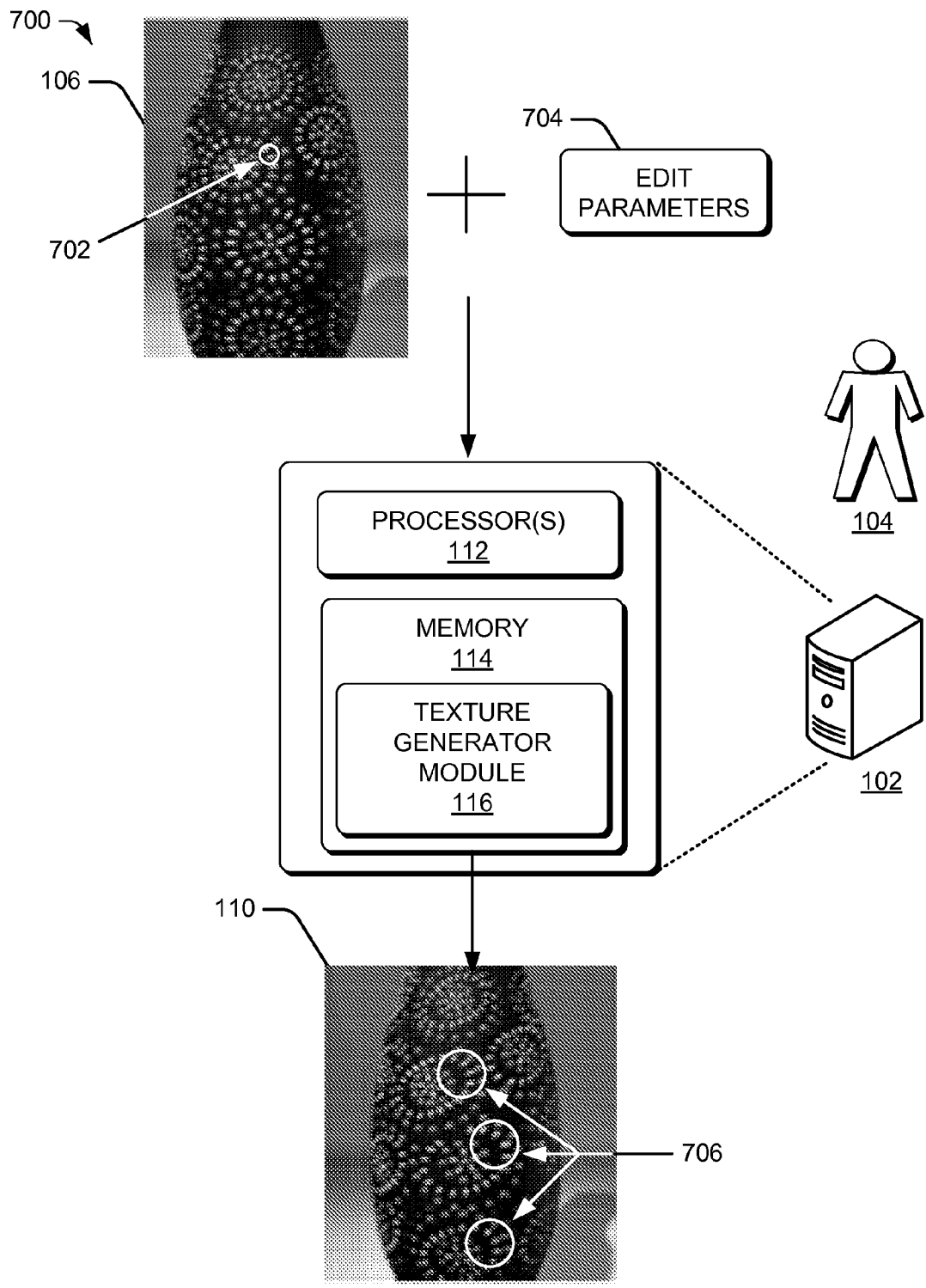
FIG. 7 is a schematic diagram of an illustrative environment used to edit discrete element textures in accordance with discrete element texture synthesis techniques.

FIG. 7 is a schematic diagram of an illustrative environment 700 of editing discrete element textures in accordance with embodiments of discrete element texture synthesis techniques. For instance, in addition to generating output textures based on an input texture and a set of boundary conditions 108, the discrete element texture synthesis techniques described herein may also be applied for editing discrete element textures, for not only individual element properties but also their distributions via the texture generator module 116.

As illustrated in FIG. 7, the computing device 102 may enable the user 104 to specify a specific discrete element 702 of the input texture 106 and edit parameters 704 such as a desired new position of the specified discrete element 702 to generate an output texture 110 in which the specified element have been edited in accordance with the edit parameters 704.

For example, in FIG. 7, the position of single discrete element 702 is shifted to the right. Accordingly, the texture generator uses the discrete element texture synthesis techniques described herein to shift all discrete elements of the output texture 110 that have similar neighborhoods (i.e., elements 706 to name a few) to the right to generate output texture 110. In other words, the texture generator automatically propagates edit parameters 704 to change to all other elements of the input texture 106 with similar neighborhoods using the discrete element texture synthesis techniques described herein.

Figure 8:
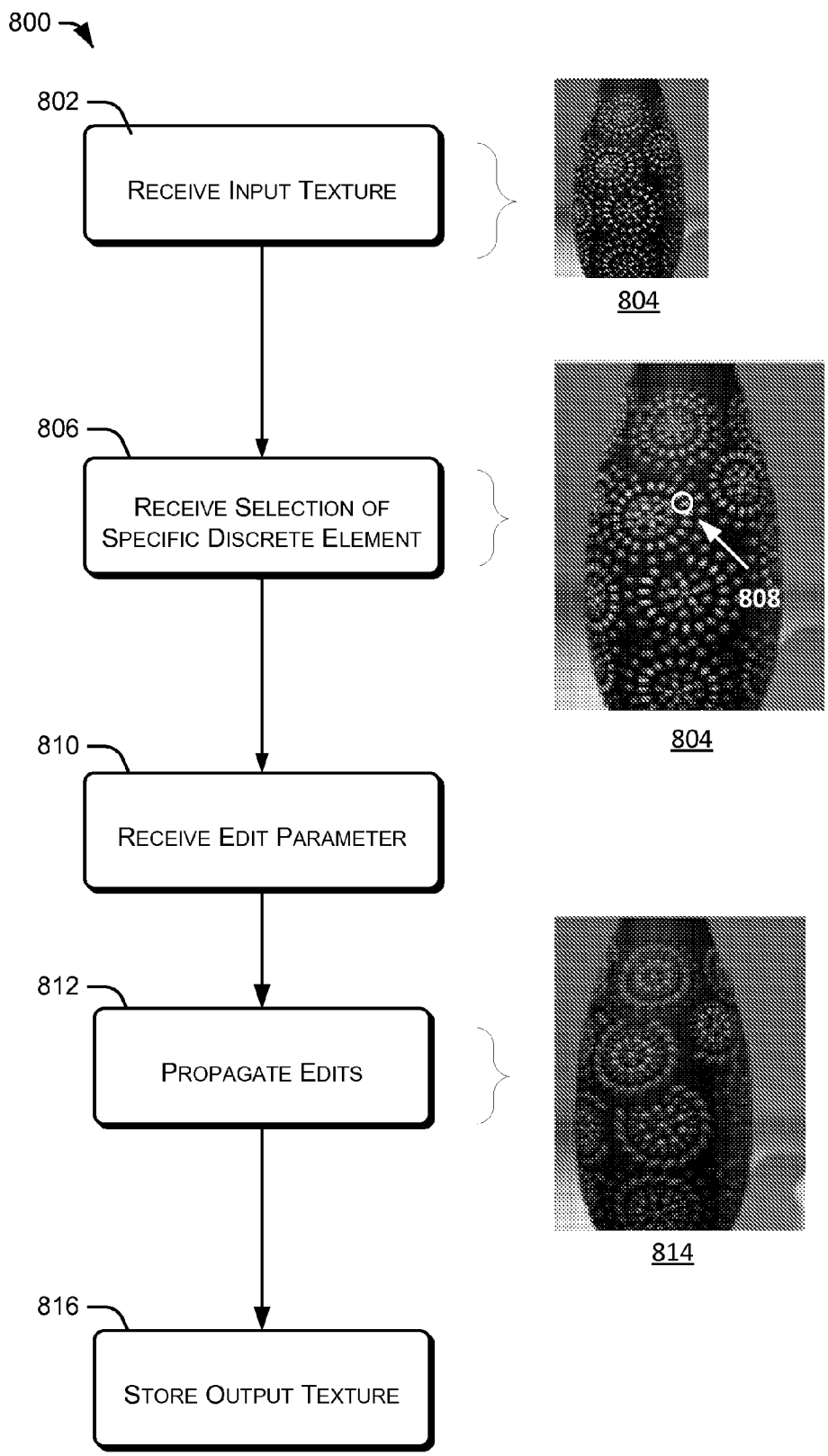
FIG. 8 is a pictorial flow diagram of an illustrative process of editing discrete element textures in accordance with discrete element texture synthesis techniques.

FIG. 8 is a pictorial flow diagram of an illustrative process 800 of editing discrete element textures in accordance with discrete element texture synthesis techniques described herein. The process 800 may be performed by the texture generator module 116.

At 802, the texture generator module receives an input texture 804 comprising discrete elements. The texture generator module 116 may receive the input texture 106 from a computer-readable medium which is either internal or external to the computing device 102.

At 806, the texture generator module 116 receives a selection 808 of specific discrete element of the input texture 804.

At 810, the texture generator module 116 receives an edit parameter. The edit parameter may specify a position edit p or attribute edit q. For example, the edit parameter may specify to edit a location, orientation, geometry, appearance, and/or type of the discrete element.

At 812, the texture generator automatically propagates relevant edits to all other elements with similar neighborhoods to the selected specific discrete element to generate output texture 814. The texture generator may automatically propagate the edits by minimizing the energy functions of Equations 1 and 4.

At 816, the texture generator stores the output texture 110 in a computer readable storage medium. The texture generator may store the output texture either to an internal computer readable storage medium such as memory 114 or an external computer readable storage medium

CONCLUSION

Although the techniques have been described in language specific to structural features and/or methodological acts, it is to be understood that the appended claims are not necessarily limited to the specific features or acts described. Rather, the specific features and acts are disclosed as exemplary forms of implementing such techniques.

What is claimed is:

1. A method of performing discrete element texture synthesis comprising:
   receiving an input texture comprising a set of multiple discrete elements;
   receiving a set of boundary conditions defining a shape of an output texture;
   initializing the output texture by copying one or more of the multiple discrete elements of the input texture to the output texture;
   determining one or more output neighborhoods representing one or more of the multiple output discrete elements spatially surrounding a center output element of the output texture;
   minimizing an energy function to generate a similarity set, the energy function measuring a similarity between a plurality of the one or more output neighborhoods and a corresponding best matching input neighborhood of the input texture;
   assigning properties to one or more multiple output discrete elements based at least in part on an analysis of one or more input discrete elements of the similarity set, wherein the assigning properties includes editing one or more attributes of the one or more multiple output discrete elements;
   propagating the edited one or more attributes to change the one or more multiple output discrete elements based at least in part on the analysis of one or more input discrete elements of the similarity set; and
   storing the output texture in a computer readable storage medium.

2. The method of claim 1, further comprising setting a size of the output neighborhood.

3. The method of claim 1, wherein at least one of the one or more attributes comprises:
an orientation of the one or more multiple output discrete elements;
a type of the one or more multiple output discrete elements;
a geometry associated with the one or more multiple output discrete elements; or
an appearance of the one or more multiple output discrete elements.

4. The method of claim 1, wherein the minimizing the energy function minimizes the energy function based at least in part on:
a relative position of input elements of the corresponding best matching input neighborhood with respect to a center of the corresponding best matching input neighborhood; and
a relative position of the output elements relative to the center output element.

5. The method of claim 4, wherein the minimizing the energy function further minimizes the energy function based at least in part on a density map term that examines a sampled density value of the one or more output neighborhoods.

6. The method of claim 4, wherein the minimizing the energy function further minimizes the energy function based at least in part on a desired local orientation of at least one of the output elements spatially surrounding the center output element of the output texture.

7. The method of claim 4, wherein the minimizing the energy function further minimizes the energy function based at least in part on a determination that an output neighborhood of the one or more output neighborhoods is on a boundary of the output texture.

8. The method of claim 1, wherein the assigning the properties to the one or more of the multiple output discrete elements includes calculating a weighted combination of a plurality of predicted positions of the one or more discrete elements within the output texture.

9. The method of claim 1, wherein the set of multiple discrete elements of the received input texture are processed to identify each of the multiple discrete elements in the set.

10. A system for generating an output texture comprising output discrete elements from an input texture comprising multiple input discrete elements, comprising:
one or more processors; and
memory to store a texture generator module executable by the one or more processors to:
determine one or more output neighborhoods representing output discrete elements spatially surrounding a center output element of the output texture;
minimize an energy function by measuring a similarity between each of the one or more output neighborhoods and a corresponding best matching input neighborhood of the input texture;
based at least in part on the minimized energy function, assign properties to the output discrete elements of the output texture;
edit one or more attributes of one or more of the multiple input discrete elements of the input texture assigned as the output discrete elements of the output texture; and
propagate the edited one or more attributes of the one or more of the multiple input discrete elements to the output discrete elements of the output texture based at least in part on the minimized energy function.

11. The system of claim 10, wherein the texture generator module is further executable by the one or more processors to edit at least one of: an orientation of one or more of the multiple input discrete elements; a geometry associated with the one or more of the multiple input discrete elements; an appearance of the one or more of the multiple input discrete elements; or a type of the one or more of the multiple input discrete elements.

12. The system of claim 10, wherein the texture generator minimizes the energy function based at least in part on:
a relative position of input elements of the corresponding best matching input neighborhood with respect to a center of the corresponding best matching input neighborhood;
a relative position of a portion of the output discrete elements with respect to a center output discrete element; and
a desired local orientation of at least one of the output discrete elements.

13. The system of claim 10, wherein the texture generator assigns the properties to the output discrete elements further based at least in part on a weighted combination of a plurality of predicted positions of the output discrete elements within the output texture.

14. The system of claim 10, wherein the texture generator assigns the properties to the output discrete elements further based at least in part on examining attributes associated with a portion of the input discrete elements, the attributes being at least one of:
a geometry associated with the portion of the input discrete elements; or
an appearance of the portion of the input discrete elements.

15. One or more computer-readable memory devices storing computer-executable instructions that, when executed on one or more processors, causes the one or more processors to perform acts comprising:
determining an output neighborhood representing output discrete elements spatially surrounding a center output discrete element of an output texture;
minimizing an energy function that measures a similarity between the output neighborhood and a corresponding best matching input neighborhood of an input texture; and
assigning properties to the output discrete elements of the output texture based on the minimized energy function, wherein the assigning properties is based at least in part on editing one or more attributes of one or more input discrete elements of the input texture; and
propagating the one or more edited attributes of one or more input discrete elements of the input texture to the output discrete elements of the output texture based on the minimized energy function.

16. The one or more computer-readable memory device as recited in claim 15, wherein the assigning properties is based in further part on at least one of: an orientation of the one or more input discrete elements; a geometry associated with the one or more input discrete elements; an appearance of the one or more input discrete elements; or a type of the one or more input discrete elements.

17. The one or more computer-readable memory device as recited in claim 15, wherein the minimizing an energy function minimizes the energy function based at least in part on:
a relative position of input elements of the corresponding best matching input neighborhood with respect to a center input element of the corresponding best matching input neighborhood;
a relative position of a portion of the output discrete elements with respect to the center output discrete element; and a desired local orientation of at least one of the output discrete elements.

18. The one or more computer-readable memory device as recited in claim 15, wherein the minimizing an energy function minimizes the energy function based at least in part on:
- a relative position of input elements of the corresponding best matching input neighborhood with respect to a center input element of the corresponding best matching input neighborhood; and
- a determination that the output neighborhood is on a boundary of the output texture.

19. The one or more computer-readable memory device as recited in claim 15, wherein the assigning the properties to the output discrete elements of the output texture assigns the properties to the output discrete elements further based on a weighted combination of a plurality of predicted positions of the output discrete elements within the output texture.

20. The one or more computer-readable memory device as recited in claim 15, further comprising, prior to determining the output neighborhood, processing the input texture to identify each of the one or more input discrete elements.

\* \* \* \* \*